(12) United States Patent
Wuidart

(10) Patent No.: US 6,925,569 B2
(45) Date of Patent: Aug. 2, 2005

(54) SECURED MICROPROCESSOR COMPRISING A SYSTEM FOR ALLOCATING RIGHTS TO LIBRARIES

(75) Inventor: Sylvie Wuidart, Pourrieres (FR)

(73) Assignee: STMicroelectronics SA, Montrouge (FR)

( * ) Notice: Subject to any disclaimer, the term of this patent is extended or adjusted under 35 U.S.C. 154(b) by 951 days.

(21) Appl. No.: 09/885,450

(22) Filed: Jun. 20, 2001

(65) Prior Publication Data

US 2002/0016890 A1 Feb. 7, 2002

(30) Foreign Application Priority Data

Jun. 28, 2000 (FR) .............................. 00 08283

(51) Int. Cl.[7] .................... G06F 11/00; G06F 9/00; G06F 12/00
(52) U.S. Cl. .................. 713/193; 713/194; 711/168; 711/170; 714/47
(58) Field of Search ................. 713/194, 193, 713/190; 714/47; 711/170, 168

(56) References Cited

U.S. PATENT DOCUMENTS

| | | | |
|---|---|---|---|
| 3,803,559 A | 4/1974 | Bandoo et al. .......... 340/172.5 |
| 4,442,484 A | 4/1984 | Childs, Jr. et al. .......... 364/200 |
| 5,452,431 A | 9/1995 | Bournas ...................... 395/442 |
| 5,457,789 A | 10/1995 | Dietrich, Jr. et al. ........ 395/427 |
| 5,551,051 A | * 8/1996 | Silverthorn et al. ......... 718/107 |
| 5,604,864 A | * 2/1997 | Noda .......................... 714/47 |
| 6,704,872 B1 | * 3/2004 | Okada ........................ 713/194 |
| 6,757,802 B2 | * 6/2004 | Trainin et al. .............. 711/170 |
| 6,820,177 B2 | * 11/2004 | Poisner ........................ 711/152 |

\* cited by examiner

*Primary Examiner*—Norman M. Wright
(74) *Attorney, Agent, or Firm*—Lisa K. Jorgenson; Allen, Dyer, Doppelt, Milbrath & Gilchrist, P.A.

(57) ABSTRACT

A secured microprocessor includes a rights allocation system for the allocation, to programs executable by the microprocessor, of permanent access rights to certain zones of the memory array of the microprocessor. The rights allocation system confers, on a sub-program shared by at least two programs, temporary rights of access to certain memory zones. The temporary rights are allocated when the sub-program is called by one of the programs as a function of the program calling the sub-program. The rights allocation system provides libraries in a secured microprocessor without harming the integrity of the rights conferred on programs using the libraries.

32 Claims, 4 Drawing Sheets

SECURED MICROPROCESSOR COMPRISING A SYSTEM FOR ALLOCATING RIGHTS TO LIBRARIES

FIELD OF THE INVENTION

The present invention relates to microprocessors, and more particularly, to a secured microprocessor. Secured microprocessors are most commonly used in applications where access to certain confidential data or programs needs to be prohibited. For example, smart cards generally include secured microprocessors to protect the memory zones which contain confidential codes or cryptography algorithms.

BACKGROUND OF THE INVENTION

Conventionally, a microprocessor is secured by an address control system which determines that the program being executed is entitled to address certain memory zones for read, write, jump or call operations. A system of this kind generally includes a rights allocation table that receives an identification code of the program being executed at a first input, and an identification code of the memory zone being addressed at a second input. The memory zone corresponds to the current address present at the address bus of the microprocessor. If it is planned in the table that the memory zone being addressed is to be accessible to the program being executed, the table delivers an authorization signal. If not, the table does not deliver the authorization signal and an address violation signal is sent.

An address control system of this kind is used to obtain the secured cohabitation of various programs in the memory array of a microprocessor by allocating different rights to each of the programs. These various programs generally correspond to different applications of the microprocessor that have been planned by the manufacturer.

The securing of a microprocessor, however, has a negative effect on the organization of the memory array in that it partitions the memory array into various mutually "sealed" parts, with each part being reserved for one application. It often happens that programs designed for different applications comprise similar computation steps that could be centralized in a common zone referred to as a library. The library designates one or more sub-programs shared by several programs, as readily understood by those skilled in the art.

This standard method of the centralization in library form of program parts common to several programs is generally prohibited with the secured microprocessors because of the problems of security that it causes. For example, let us assume that a program PGA enjoys rights to access a zone X of a memory array and that a program PGB enjoys rights to access a zone Y distinct from zone X. The designing of a sub-program shared by the programs PGA and PGB leads to the question of finding out which are the rights to be conferred on the sub-program. If the sub-program has to be able to read or write data in the zone X when it is called by the program PGA and to read or write in the zone Y when it is called by the program PGB, the sub-program must be given the total rights of the programs PGA and PGB, i.e., namely rights on the zone X and on the zone Y.

However, the program PGB or a fraudulent program loaded in the location of the program PGB could use the sub-program to access the zone X reserved for the program PGA and vice versa. The designing of a sub-program shared by two programs having different rights of access to the memory array is therefore a breach in the partitioning of the memory array.

SUMMARY OF THE INVENTION

In view of the foregoing background, an object of the present invention is to provide for sub-programs shared by several programs without jeopardizing the integrity of the rights conferred on each of the programs.

This and other objects, advantages and features of the present invention are provided by a secured microprocessor comprising a rights allocation system for the allocation, to programs executable by the microprocessor, of permanent access rights to certain zones of the memory array of the microprocessor. The rights allocation system comprises means to confer, on a sub-program shared by at least two programs, temporary rights of access to certain memory zones when the sub-program is called by one of the programs. The extent of the temporary rights is a function of the program calling the sub-program.

According to one embodiment, the rights allocation system comprises means to temporarily confer the rights of the calling program on a sub-program.

According to another embodiment, the rights allocation system comprises means to furthermore confer permanent rights on a sub-program that is independent of those of the calling program.

According to yet another embodiment, the rights allocation system comprises a rights allocation table for the reception of an identification code of a program or a sub-program at a first input, and an identification code of the memory zones designated by the current addresses on the address bus of the microprocessor at a second input. The rights allocation system also comprises means for the application, to the first input of the rights allocation table, during the execution of a sub-program, of an identification code of the program that has called the sub-program.

According to another embodiment, the rights allocation system comprises means for the simultaneous application, to the first input of the rights allocation table, during the execution of a sub-program, of an identification code of the sub-program being executed and an identification code of the program having called the sub-program.

According to another embodiment, bits of the identification code of the sub-program being executed and bits of the identification code of the program having called the sub-program are combined by a logic function before being applied to the first input of the rights allocation table.

According to yet another embodiment, the rights allocation system comprises a first latch for the storage, during the execution of an instruction, of the identification code of the program or sub-program being executed. The rights allocation system also comprises a second latch having its input connected to the output of the first latch for storing the identification code of a program being executed when the microprocessor switches over into a sub-program. This is done to form the identification code of the program that has called this sub-program. The second latch is reset when the microprocessor exits from the sub-program.

According to another embodiment, the loading and resetting of the second latch is controlled by an address decoder receiving, at its input, the current addresses on the address bus, for the application of a loading signal to the second latch when the address of the first instruction of a sub-program is detected. A resetting signal is delivered to the second latch when the address of the last instruction of the sub-program is detected.

According to another embodiment, the identification codes of the memory zones designated by the current addresses and the identification codes of the programs and sub-programs being executed are delivered by an address decoder receiving, at its input, the current addresses on the address bus.

According to another embodiment, the rights allocation system sends out a violation signal when an address present at the address bus does not correspond to the rights permanently or temporarily allocated to the program or sub-program being executed.

According to yet a further embodiment, the address violation signal is processed by an interrupt decoder to send the microprocessor into an address violations processing sub-program.

BRIEF DESCRIPTION OF THE DRAWINGS

These objects, characteristics and advantages of the invention as well as others shall be explained in greater detail in the following description of an exemplary embodiment of a microprocessor according to the invention, given by way of a non-restrictive description and made with reference to the appended figures, of which.

DETAILED DESCRIPTION OF THE PREFERRED EMBODIMENTS

Figure 1:
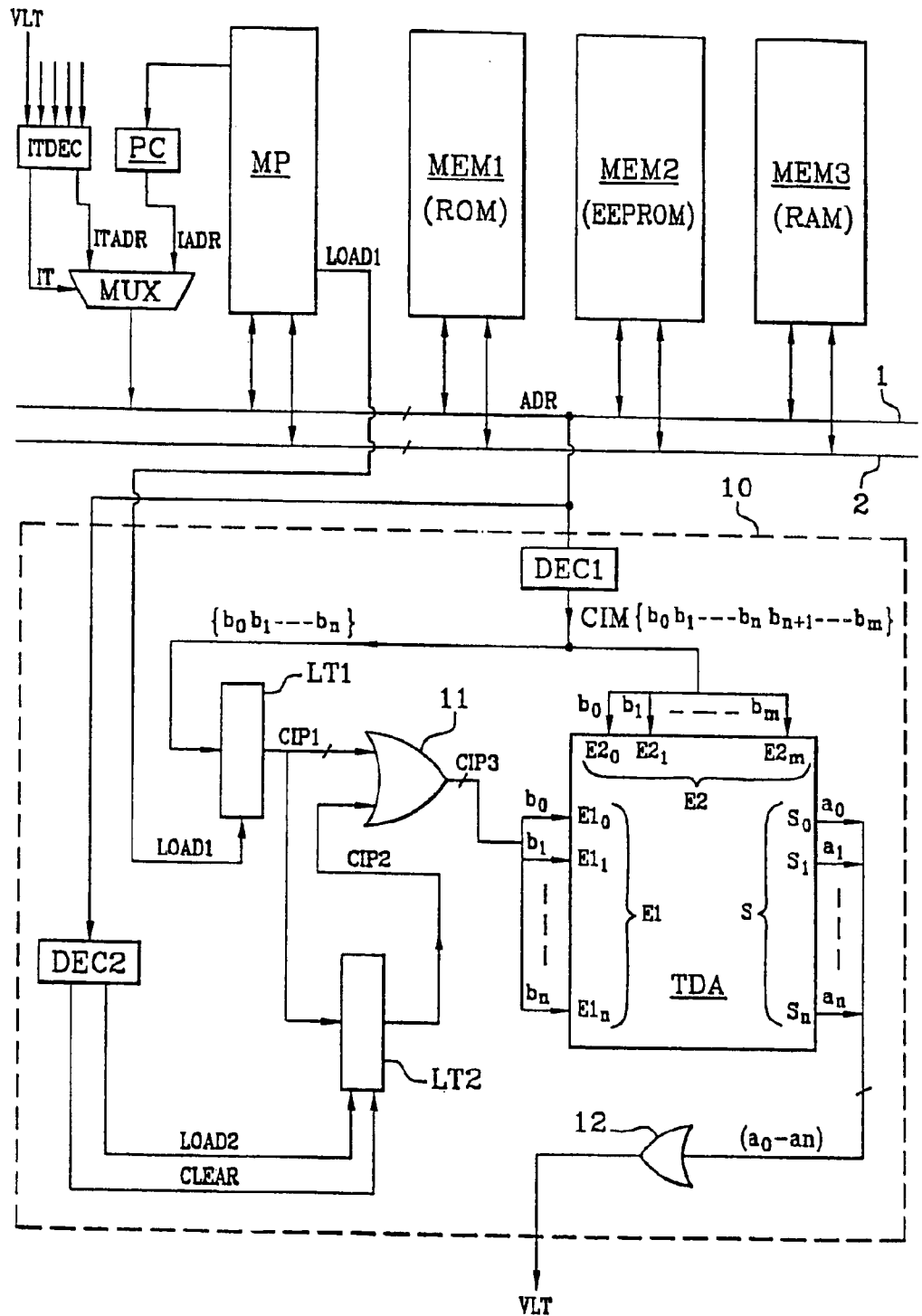
FIG. 1 is a block diagram of a microprocessor comprising a rights management system according to the present invention.

FIG. 1 is a block diagram of a microprocessor MP provided with a read-only memory MEM1 (ROM), an electrically erasable and programmable memory MEM2 (EEPROM) and a random-access memory MEM3 (RAM). These various memories are connected to the microprocessor by an address bus 1 and a data bus 2, and together form the memory array of the microprocessor.

According to the present invention, the microprocessor MP comprises a rights allocation system 10 that confers variable access rights on sub-programs as a function of the calling program. The rights allocation system 10 comprises two address decoders DEC1, DEC2 connected at their inputs to the address bus to receive the current addresses ADR circulating on the address bus. The decoder DEC1 delivers a code CIM for the identification of memory zones of the type:

$$CIM = b0\ b1\ \ldots\ bn\ bn+1\ \ldots\ bm$$

in which each bit is assigned to the identification of a predetermined memory zone. Only one bit at a time can be a 1 while the others are a 0.

Hereinafter, it is assumed that the bits b0 to bn are assigned to the designation of memory zones comprising memories while the bits bn+1 to bm are assigned to the designation of memory zones comprising data. The memory zones are, for example, localized in the memory MEM1 (ROM) while the data zones are localized in the memories MEM2 and MEM3.

The bits b0–bn of the code CIM are applied to the input of a latch LT1 driven by the loading signal LOAD1 delivered by the microprocessor MP. When the signal LOAD1 is applied to the latch LT1, the output of the latch copies the input of the latch and delivers a code CIP1 for the identification of program zones.

The code CIP1 is applied to the input of a second latch LT2 driven by a loading signal LOAD2 and a resetting signal RST delivered to the decoder DEC2. When the signal LOAD2 is applied to the latch LT2, the output of the latch delivers a code CIP2 which copies the code CPI1 present at its input.

The codes CIP1 and CIP2 are combined to form a resultant code CIP3 that is applied to an input E1 of a rights allocation table TDA receiving, at an input E2, the code CIM delivered by the decoder DEC1. In the present embodiment, the combination of the code CIP1, CIP2 is provided by an OR gate 11 whose output delivers a code CIP3 equal to the bit-by-bit logic sum of the codes CIP1 and CIP2.

The allocation table TDA comprises an output that includes the elementary outputs $S_0$–$S_n$. Each output $S_0$–$S_n$ corresponds to one same-ranking elementary input $E1_1, \ldots, E1_n$ of the input E1, and receives one of the bits of the code CIP3. The output $S_0$–$S_n$ delivers access rights in the form of authorization bits $a_0$ to $a_n$. An authorization bit $a_i$ is equal to 1 when the corresponding input $E1_i$ receives a bit $b_i$ equal to 1 forming, with the bit $b_i$, an authorized combination $b_i$, $b_j$ of bits at 1. The authorized combinations $b_i$, $b_j$ are registered in the table to define permanent rights.

The loading signal LOAD1 of the latch LT1 is delivered by the microprocessor MP when it reads or is on the point of reading an instruction in the memory MEM1 (read cycle or fetch cycle of the microprocessor). At this point in time, the address ADR present on the address bus is the address IADR of the instruction, delivered by the counter PC of the microprocessor. Thus, the code CIM delivered by the decoder DEC1 comprises a bit $b_i$ to 1 that designates the memory zone comprising this instruction. This bit $b_i$ is found in the code CIP1 recorded by the latch LT1 and at the input E1 of the table DTA.

Furthermore, the signal LOAD2 is delivered by the decoder DEC2 when it detects the address ADRin of the first instruction of a shared sub-program on the bus 1, and the signal RST is delivered by the decoder DEC2 when it detects the address ADRout of the last instruction of the sub-program on the address bus. The addresses ADRin, ADRout are predetermined and represent the input address and the output address of the sub-program considered. If several sub-programs are shared by programs, the decoder DEC2 is configured to detect the input addresses and output addresses of each of the sub-programs, and send the signal LOAD2 or the signal RST when one of these addresses is detected.

The system 10 according to the invention works conventionally during the execution of a program, because the output of the latch LT2 is at 0. The code CIP3 applied to the table TDA is thus equal to the code CIP1. During the execution of the program, after the loading of each new instruction, it often happens that the current address ADR on the address bus changes and designates another zone of the memory.

An example is when the instruction being executed is an instruction for reading or writing in the memory array. In this case, the code CIM delivered by the decoder DEC1 changes its value and has a different bit $b_j$ at 1, which designates the corresponding memory zone. If the combination $b_i$, $b_j$ applied to the table TDA is authorized, the output $S_i$ of the table remains at 1. Otherwise, the output $S_i$ goes to 0 and the violation signal VLT goes to 1. After the execution of the instruction, the address IADR of the new instruction is sent on the address bus and leads to another change of the code CIM and the automatic verification in the table TDA of another combination $b_i$, $b_j$ of code bits. If this address corresponds to a jump in a sub-program, a corresponding authorization must be planned in the table TDA.

Operation of the system 10 according to the invention differs from a standard address control system when the program comprises an instruction for a jump or a call towards a shared sub-program. At the point in time when the address ADRin of the first instruction of the sub-program is located on the address bus, the decoder DEC2 delivers the signal LOAD2 and the latch LT2 records the code CIP1 before the microprocessor switches over to the sub-program.

Thus, when the microprocessor has switched over to the sub-program, the code CIP1 at the output of the latch LT1 designates the memory zone containing the sub-program while the code CIP2 at the output of the latch LT2 designates the memory zone in which there is the program having called the sub-program. The code CIP1 thus identifies the sub-program being executed and the code CIP2 identifies the program that has called the sub-program.

Since the codes CIP1, CIP2 are combined here in the OR gate 11, the table TDA receives a code CIP3 at its input E1. This code CIP3 comprises two bits $b_i$ at 1 instead of only one bit. The first bit corresponds to the sub-program being executed, and the second bit corresponds to the program that has called the sub-program. The application of the table TDA of the bit $b_i$ corresponding to the calling program authorizes combinations of bits $b_i$, $b_j$ with the bits of the code CIM that are specific to the calling program. Thus the called sub-program, during its execution, inherits rights conferred on the calling program. These rights transferred to the sub-program get added to the permanent rights which are allocated to it. However, these rights can be chosen to be zero.

The system 10 according to the invention thus carries out a dynamic allocation of rights to a called sub-program that ceases when the microprocessor returns to the calling program, at the time when the decoder DEC2 detects the output address ADRout of the sub-program and resets the code CIP2.

In practice, the signal VLT which is sent when a violation of a permanent or temporary right occurs, may be used in different ways to prevent access to the prohibited memory zone. As shown in FIG. 1, the signal VLT is, for example, applied to an input of the interrupt decoder ITDEC whose output delivers the address ITADR of a sub-program for processing cases of address violation. The address ITADR is applied to an input of a multiplexer MUX that receives, at another input, the address IADR of the following instruction delivered by the counter PC. The multiplexer is driven by a signal IT delivered by the decoder ITDEC, and delivers the address ITADR to the address bus instead of the address IADR when the signal IT is sent.

In one alternative embodiment, the signal VLT is used to set the resetting signal of the microprocessor (RESET) at zero in such as way as to deactivate this microprocessor. In another alternative embodiment, the signal VLT is used to generate a non-maskable interrupt.

Figure 2:
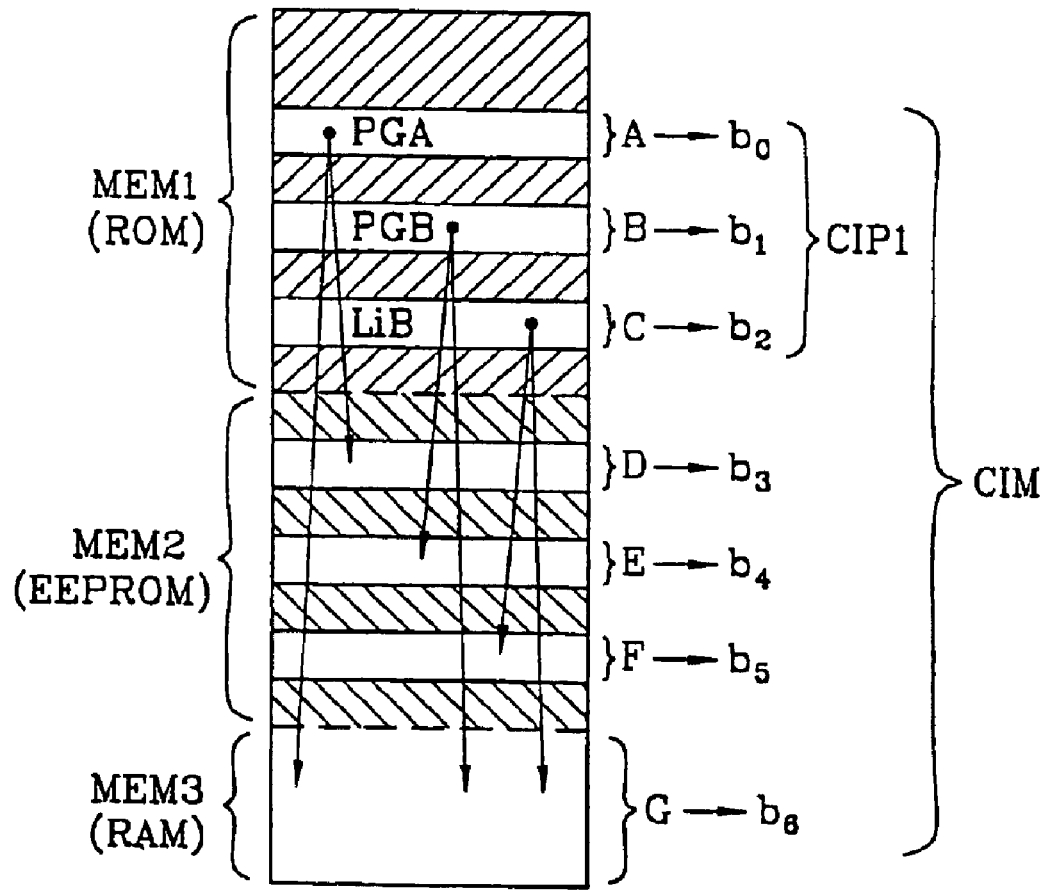
FIG. 2 illustrates a memory array of the microprocessor and illustrates an exemplary application of the rights management system according to the present invention.

Operation of the system 10 according to the invention will be understood more clearly with reference to the exemplary implementation shown in FIG. 2. FIG. 2 shows the memory array of the microprocessor in which certain memory zones are reserved for applications, with the others being strictly prohibited and being shown in hatched form.

Thus, the figure shows a zone A in which a program PGA is recorded, a zone B in which a program PGB is recorded, a zone C in which there is recorded a sub-program LIB (library) shared by the programs PGA and PGB, a data zone D reserved in write and read mode for the program PGA, a data zone E reserved in write and read mode for the program PGB, a data zone F reserved in write and read mode for the sub-program LIB, and a zone G available in write and read mode for the three programs PGA, PGB, LIB.

The zones A, B, C are for example in the memory MEM1 (ROM), the zones D, E, F are in the memory MEM2 (EEPROM) and the zone G is in the memory MEM3 (RAM). As shown, the identification code CIM of the memory zones thus comprises seven code bits b0 to b6 respectively assigned to the identification of the zones A to G, and the codes CIP1, CIP2 for the identification of the program zones comprise the bits b0, b1 and b2.

In this example, it is desired that the sub-program LIB should benefit from the rights of the program PGA or PGB that calls it so that the program PGA can ask the sub-program to make a recording in the zone D of the results of computation steps, and so that the program PGB can ask the sub-program to make a recording in the zone E of such results. The sub-program is able to use the zones F and G, by virtue of permanent rights, for the storage of the temporary results.

In the prior art, the approach used to achieve this goal could lie in making the sub-program allocate permanent rights to the zones D and E, but this would entail a breach in the partitioning walls of the memory array. According to the invention, the rights on one of the zones D and E are allocated temporarily to the sub-program as a function of the calling program, when the microprocessor enters the sub-program.

Figure 3:
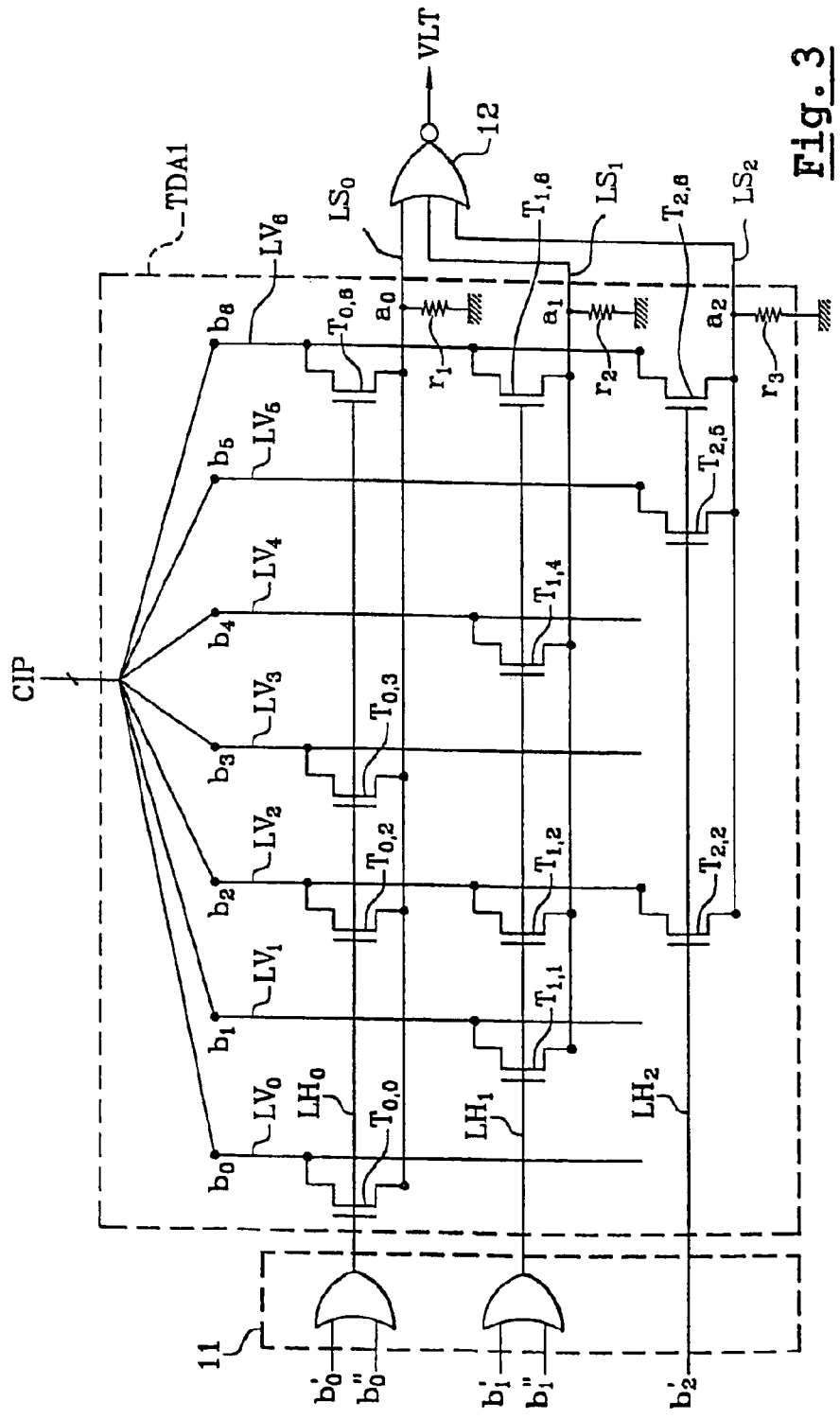
FIG. 3 illustrates an exemplary embodiment of a rights allocation table corresponding to the example shown in FIG. 2.

To provide a clearer illustration, FIG. 3 shows an exemplary embodiment of a table TDA1 used to generate an allocation of temporary rights such as this. The table TDA1 comprises three horizontal lines LH0 to LH2, seven vertical lines LV0 to LV6 and three output lines LS0 to LS2. In order to make it easier to understand what follows, the bits of the identification code CIP1 of the program being executed are referenced b0' to b2', and the bits of the identification code CIP2 of the program calling the sub-program are referenced b0" to b2".

The vertical lines LV0 to VL6 respectively receive the bits b0 to b6 of the code CIM. The line LH0 receives the result of the logic addition of the bit b0' to b0". The line LH1 receives the result of the logic addition of the bits b1' and b1". The line LH2 receives the bit b2' only because the bit b2' is still at zero. The lines LS0 to LS2 respectively deliver authorization bits a0 to a2 which are combined in the gate 12 to form the signal VLT.

The permanent rights of access to the memory array to be allocated to the programs PGA, PGB and to the sub-program LIB take the form of MOS transistors Ti,j laid out at the intersection of the horizontal lines LHi and the vertical lines LVj. A transistor Ti,j, laid out at the intersection of the lines Lhi, LVj, is connected by its gate to the line Lhi by its drain to the line LVj and by its source to the output line LSi. Here, it is thus possible to distinguish transistors at the intersections between the line LH0 and the lines LV0, LV2, LV3 and LV6, that determine the permanent rights of the program PGA on its own memory zone A, on the memory zone C containing the sub-program LIB and on the memory zones D and G (FIG. 2).

The figure also shows transistors at the intersections between the line LH1 and the lines LV1, LV2, LV4 and LV6 that determine the permanent rights of the program PGB, and transistors at the intersections between the line LH2 and the lines LV2, LV5 and LV6 that determine the permanent rights of the sub-program LIB on its own program memory zone C and on the memory zones F and G.

Operation of the table TDA1 is standard with respect to the allocation of the permanent rights to the programs PGA, PGB, LIB. Each output line LS0 to LS1 is held at a 0 by a resistor, respectively r1 to r3, and is taken to a 1 when a transistor Ti,j connected by its source to the output line receives a bit at 1 at its gate and the logic 1, corresponding to the supply voltage of the system, at its drain.

The allocation of temporary and permanent rights of the sub-program takes place when the microprocessor switches to the sub-program. At this point in time, the bit b2' of the code CIP1 is at 1. This activates the rights of the sub-program. Furthermore, the bit b0" or the bit b1" of the code CIP2 is also at 1 depending on whether the sub-program has been called by the program PGA or PGB. This keeps the rights of the program PGA or PGB to the benefit of the sub-program.

Naturally, the table TDA1 is itself open to various alternative embodiments, especially in inverse logic configurations, that are within the scope of those skilled in the art. Furthermore, although it has been proposed above to transfer the rights of the calling program to a sub-program, various other alternative embodiments of the present invention may be planned with respect to the extent of the temporary rights allocated to sub-programs.

Figure 4:
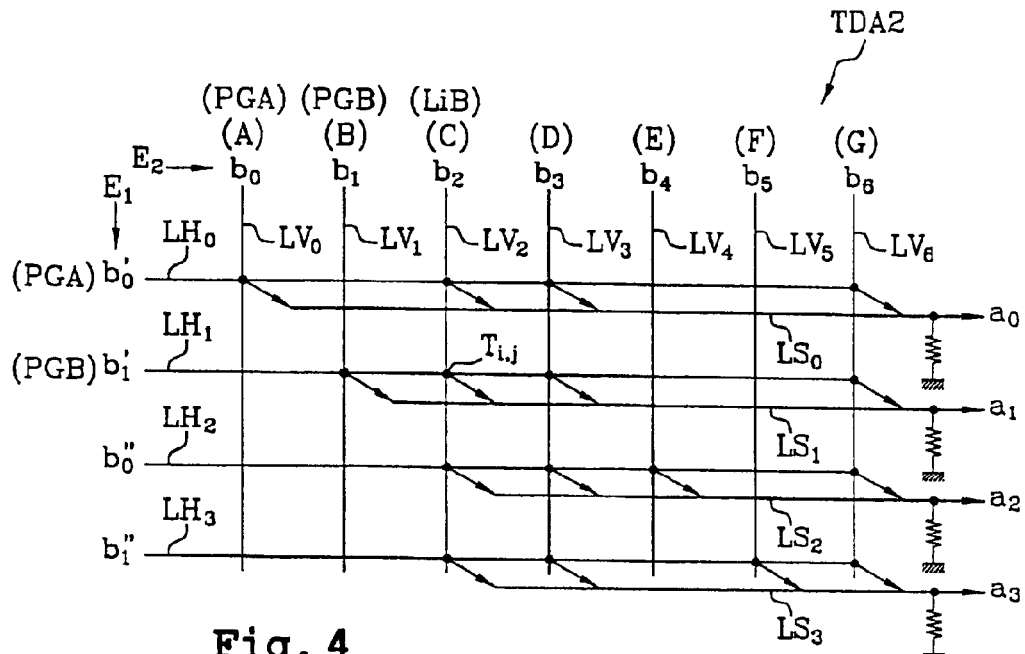
FIGS. 4 and 5 respectively illustrate a schematic view of two other exemplary embodiments of the rights allocation table according to the present invention.

By way of an example, FIG. 4 shows a table TDA2 having the same vertical lines LV0 to LV6 as the table TDA1 but comprising four horizontal lines LH0 to LH3 respectively receiving the bits b0', b1', b0" and b1" without any logic combination of these bits. The transistors Ti,j at the intersections of the lines are represented schematically by dots connected by arrows to the output lines, in this case four lines LS0 to LS3. No horizontal line is provided here to allocate permanent rights to the sub-program LIB. These permanent rights are therefore zero in this example but it could also be planned that they are not zero.

The table TDA2 differs from the table TDA1 in that the lines LH0 and LH1 define the permanent rights of the programs PGA and PGB while the lines LH2, LH3, which are activated only by the bits b0" and b1", define the temporary rights of the sub-program LIB. Since the lines LH2, LH3 are distinct and independent of the lines LH0, LH1, it is possible to allocate temporary rights, distinct from the permanent rights of the calling program, to the sub-program as a function of the calling program. Thus, in the example shown, the transistors Ti,j is laid out so that the following allocations are made:

to the program PGA: rights on its own program zone A, rights on the program zone C of the sub-program LIB and rights on the zone G, to the program PGB: rights on its own program zone B, rights on the program zone C of the sub-program LIB and rights on the zone G, to the sub-program LIB, when it is called by the program PGA: rights on its own program zone C and rights in the zones E and G, and to the sub-program LIB, when it is called by the program PGB: rights on its own program zone C and rights on the zones F and G, Ultimately, by providing two special lines LH2, LH3 receiving the bits b0", b1" recorded by the latch LT2 at the switch over into the sub-program program, it is possible to allocate special rights to the sub-program. These special rights depend on the calling program and, at the same time are independent of the rights of this program. Furthermore, it can be seen in this example that the rights allocated to the sub-program LIB are also assigned to any other sub-program capable of being called by the programs PGA and PGB, since the allocation of rights relies only on the bits b0", b1" of the code CIP2.

Figure 5:
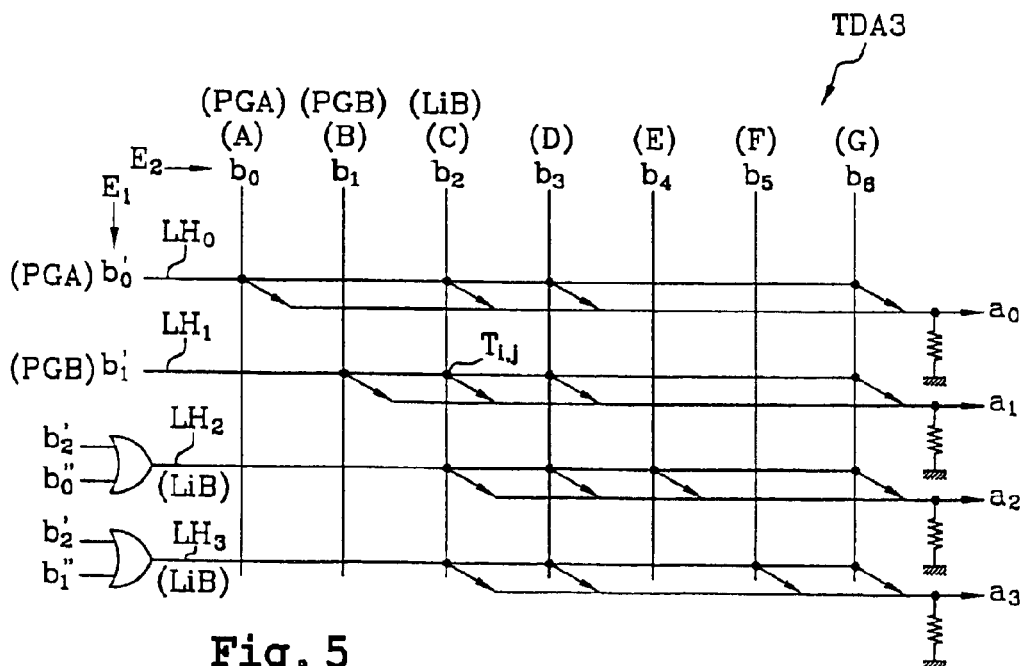

FIG. 5 shows a table TDA3 similar to the table TDA2, but wherein the line LH2 receives the bit b0" combined with the bit b2' by an AND gate, and the line LH3 receives the bit b1" combined with the bit b2' by another AND gate. In this case, the line LH2 or the line LH3 can be activated only on the twofold condition that the bit b2' is equal to 1 and that the bit b0" or b1" is also at 1. Thus, the temporary transfer of rights is reserved here for the sub-program LIB to the exclusion of any other possible sub-program.

The present invention is of course open to other variations and alternative embodiments based on the principle, according to the invention, of a transfer of temporary rights to sub-programs by storage of the identity of the calling program. In particular, cascaded transfers of rights may be planned for second-level sub-programs called by first-level sub-programs which are themselves called by main programs.

Finally, although the embodiments of the rights allocation tables described above have been presented in the form of transistor-based matrix circuits, with a view to facilitating the understanding of the invention, it must be noted that a rights allocation table according to the invention is capable, in practice, of assuming several other forms. In particular, a table of this kind can be made in the form of a Boolean logic circuit generated automatically by a VHDL language compiler. This method for the automatic generation of logic circuits from a function written in high-level language has undergone major development in recent years.

What is claimed is:

1. A secured microprocessor device comprising:
   a microprocessor, an address bus, and a memory array connected to said microprocessor by said address bus, said memory array divided into a plurality of memory zones; and
   a rights allocation system cooperating with said microprocessor and said memory array for allocating, to programs executable by said microprocessor, permanent rights of access to at least one memory zone, said rights allocation system including a rights allocation table having first and second inputs and receiving, at the first input, an identification code of a program or of a sub-program and, at the second input, an identification code of memory zones designated by a current address on said address bus;
   said rights allocation system being arranged to confer, on a sub-program shared by at least two programs, temporary rights of access to at least one memory zone when the sub-program is called by one of the at least two programs, and said rights allocation system comprising first input means for applying, to the first input of the rights allocation table, during execution of the sub-program, an identification code of the program having called the sub-program.

2. A secured microprocessor device according to claim 1, wherein said rights allocation system comprises means to temporarily confer rights of the calling program on the sub-program.

3. A secured microprocessor device according to claim 1, wherein said rights allocation system comprises means to confer permanent rights on the sub-program that are independent of those of the calling program.

4. A secured microprocessor device according to claim 1, wherein said rights allocation system comprises means for simultaneously applying, to the first input of the rights allocation table, during execution of the sub-program, an identification code of the sub-program being executed and the identification code of the program having called the sub-program.

5. A secured microprocessor device according to claim 4, wherein said first input means comprises a logic device; and wherein bits of the identification code of the sub-program being executed and bits of the identification code of the program having called the sub-program are combined by said logic device before being applied to the first input of the rights allocation table.

6. A secured microprocessor device according to claim 1, wherein said rights allocation system comprises:
   a first latch for storing, during execution of an instruction, an identification code of the program or sub-program being executed; and
   a second latch, having an input connected to an output of said first latch, for storing the identification code of the program being executed when said microprocessor switches to the sub-program, and for forming the identification code of the program that called the sub-program, with said second latch being reset when said microprocessor exits from the sub-program.

7. A secured microprocessor device according to claim 6, wherein said rights allocation system further comprises a first address decoder connected to said address bus; and wherein loading and resetting of said second latch is controlled by said first address decoder receiving current addresses on said address bus, and for applying a loading signal to said second latch when an address of a first instruction of the sub-program is detected, and for delivering a resetting signal to said second latch when an address of a last instruction of the sub-program is detected.

8. A secured microprocessor device according to claim 6, wherein said rights allocation system further comprises a second address decoder connected to said address bus; and wherein the identification codes of the memory zones designated by current addresses and the identification codes of the programs and sub-programs being executed are delivered by said second address decoder receiving the current addresses on said address bus.

9. A secured microprocessor device according to claim 1, wherein said rights allocation system generates an address violation signal when an address on said address bus does not correspond to rights permanently or temporarily allocated to the program or sub-program being executed.

10. A secured microprocessor device according to claim 9, further comprising an interrupt decoder connected to said rights allocation system; and wherein the address violation signal is processed by said interrupt decoder for causing said microprocessor to execute an address violations processing sub-program.

11. A secured microprocessor device comprising:
   a microprocessor, an address bus, and a memory array connected to said microprocessor by said address bus, said memory array divided into a plurality of memory zones; and
   a rights allocation system cooperating with said microprocessor and said memory array for allocating, to programs executable by said microprocessor, permanent rights of access to at least one memory zone, said rights allocation system including a rights allocation table having first and second inputs and receiving, at the first input, an identification code of a program or of a sub-program and, at the second input, an identification code of memory zones designated by a current address on said address bus;
   said rights allocation system being arranged to confer, on a sub-program shared by at least two programs, temporary rights of access to at least one memory zone when the sub-program is called by one of the at least two programs.

12. A secured microprocessor device according to claim 11, wherein said rights allocation system comprises a logic device for applying, to the first input of the rights allocation table, during execution of the sub-program, an identification code of the program having called the sub-program.

13. A secured microprocessor device according to claim 11, wherein said rights allocation system comprises means to temporarily confer rights of the calling program on the sub-program.

14. A secured microprocessor device according to claim 11, wherein said rights allocation system comprises means to confer permanent rights on the sub-program that are independent of those of the calling program.

15. A secured microprocessor device according to claim 11, wherein said rights allocation system comprises means for simultaneously applying, to the first input of the rights allocation table, during execution of the sub-program, an identification code of the sub-program being executed and the identification code of the program having called the sub-program.

16. A secured microprocessor device according to claim 15, wherein bits of the identification code of the sub-program being executed and bits of the identification code of the program having called the sub-program are combined by said logic device before being applied to the first input of the rights allocation table.

17. A secured microprocessor device according to claim 11, wherein said rights allocation system comprises:
   a first latch for storing, during execution of an instruction, an identification code of the program or sub-program being executed; and
   a second latch, having an input connected to an output of said first latch, for storing the identification code of the program being executed when said microprocessor switches to the sub-program, and for forming the identification code of the program that called the sub-program, with said second latch being reset when said microprocessor exits from the sub-program.

18. A secured microprocessor device according to claim 17, wherein said rights allocation system further comprises a first address decoder connected to said address bus; and wherein loading and resetting of said second latch is controlled by said first address decoder receiving current addresses on said address bus, and for applying a loading signal to said second latch when an address of a first instruction of the sub-program is detected, and for delivering a resetting signal to said second latch when an address of a last instruction of the sub-program is detected.

19. A secured microprocessor device according to claim 17, wherein said rights allocation system further comprises a second address decoder connected to said address bus; and wherein the identification codes of the memory zones designated by current addresses and the identification codes of the programs and sub-programs being executed are delivered by said second address decoder receiving the current addresses on said address bus.

20. A secured microprocessor device according to claim 11, wherein said rights allocation system generates an address violation signal when an address on said address bus does not correspond to rights permanently or temporarily allocated to the program or sub-program being executed.

21. A secured microprocessor device according to claim 20, further comprising an interrupt decoder connected to said rights allocation system; and wherein the address violation signal is processed by said interrupt decoder for causing said microprocessor to execute an address violations processing sub-program.

22. A method for sharing a sub-program by at least two programs within a secured microprocessor device comprising a microprocessor, an address bus, and a memory array connected to the microprocessor by the address bus, the memory array divided into a plurality of memory zones, and a rights allocation system cooperating with the microprocessor and the memory array, the method comprising:

allocating, to programs executable by the microprocessor, permanent rights of access to at least one memory zone, the rights allocation system including a rights allocation table having first and second inputs and receiving, at the first input, an identification code of a program or of a sub-program and, at the second input, an identification code of memory zones designated by a current address on the address bus;

the rights allocation system being arranged to confer, on a sub-program shared by at least two programs, temporary rights of access to at least one memory zone when the sub-program is called by one of the at least two programs.

23. A method according to claim 22, wherein the rights allocation system comprises a logic device for applying, to the first input of the rights allocation table, during execution of the sub-program, an identification code of the program having called the sub-program.

24. A method according to claim 22, wherein the rights allocation system comprises means to temporarily confer rights of the calling program on the sub-program.

25. A method according to claim 22, wherein the rights allocation system comprises means to confer permanent rights on the sub-program that are independent of those of the calling program.

26. A method according to claim 22, wherein the rights allocation system comprises means for simultaneously applying, to the first input of the rights allocation table, during execution of the sub-program, an identification code of the sub-program being executed and the identification code of the program having called the sub-program.

27. A method according to claim 26, wherein bits of the identification code of the sub-program being executed and bits of the identification code of the program having called the sub-program are combined by the logic device before being applied to the first input of the rights allocation table.

28. A method according to claim 22, wherein the rights allocation system comprises:

a first latch for storing, during execution of an instruction, an identification code of the program or sub-program being executed; and a second latch, having an input connected to an output of the first latch, for storing the identification code of the program being executed when the microprocessor switches to the sub-program, and for forming the identification code of the program that called the sub-program, with the second latch being reset when the microprocessor exits from the sub-program.

29. A method according to claim 28, wherein the rights allocation system further comprises a first address decoder connected to the address bus; and wherein loading and resetting of the second latch is controlled by the first address decoder receiving current addresses on the address bus, and for applying a loading signal to the second latch when an address of a first instruction of the sub-program is detected, and for delivering a resetting signal to the second latch when an address of a last instruction of the sub-program is detected.

30. A method according to claim 28, wherein the rights allocation system further comprises a second address decoder connected to the address bus; and wherein the identification codes of the memory zones designated by current addresses and the identification codes of the programs and sub-programs being executed are delivered by the second address decoder receiving the current addresses on the address bus.

31. A method according to claim 22, wherein the rights allocation system generates an address violation signal when an address on the address bus does not correspond to rights permanently or temporarily allocated to the program or sub-program being executed.

32. A method according to claim 31, further comprising an interrupt decoder connected to the rights allocation system; and wherein the address violation signal is processed by the interrupt decoder for causing the microprocessor to execute an address violations processing sub-program.

\* \* \* \* \*